United States Patent [19]

Aoki et al.

[11] Patent Number: 4,785,907

[45] Date of Patent: Nov. 22, 1988

[54] EMERGENCY UNLOCK ASSEMBLY FOR ONBOARD LOCK MECHANISM

[75] Inventors: Kohji Aoki, Nagoya; Tomio Yasuda, Kasukabe, both of Japan

[73] Assignee: Aisin Seiki Kabushiki Kaisha, Kariya, Japan

[21] Appl. No.: 131,403

[22] Filed: Dec. 10, 1987

[30] Foreign Application Priority Data

Dec. 12, 1986 [JP] Japan ............ 61-295990

[51] Int. Cl.[4] ............ B60R 25/00; B62H 5/00

[52] U.S. Cl. ............ 180/274; 180/281; 180/282; 180/289

[58] Field of Search ............ 180/271, 274, 281, 282, 180/289

[56] References Cited

U.S. PATENT DOCUMENTS

| | | | |
|---|---|---|---|
| 2,714,521 | 8/1955 | Graham | 180/281 |
| 3,722,615 | 3/1973 | Okada et al. | 180/281 |
| 4,422,521 | 12/1983 | Mochida | 180/271 |
| 4,657,105 | 4/1987 | Miyada | 180/274 |

FOREIGN PATENT DOCUMENTS

| | | |
|---|---|---|
| 55-95787 | 7/1980 | Japan . |
| 58-11275 | 1/1983 | Japan . |
| 58-146677 | 9/1983 | Japan . |

*Primary Examiner*—Kenneth R. Rice

*Attorney, Agent, or Firm*—Banner, Birch, McKie and Beckett

[57] ABSTRACT

An emergency unlock assembly is provided for unlocking a lock mechanism associated with an onboard opening cover such as a boarding door, in response to the detection of an impact applied. The assembly includes means for detecting the presence or absence of an occupant within a vehicle. When the presence of an occupant is detected, the lock mechanism is unlocked in response to the detection of an impact applied. The lock mechanism is not unlocked in response to the detection of an impact applied in the absence of an occupant. This allows a rapid rescue of an inboard occupant in the event of an emergency while reliably preventing a casuality such as a theft of or articles placed in a vehicle in the absence of an occupant.

8 Claims, 12 Drawing Sheets

Fig.2b
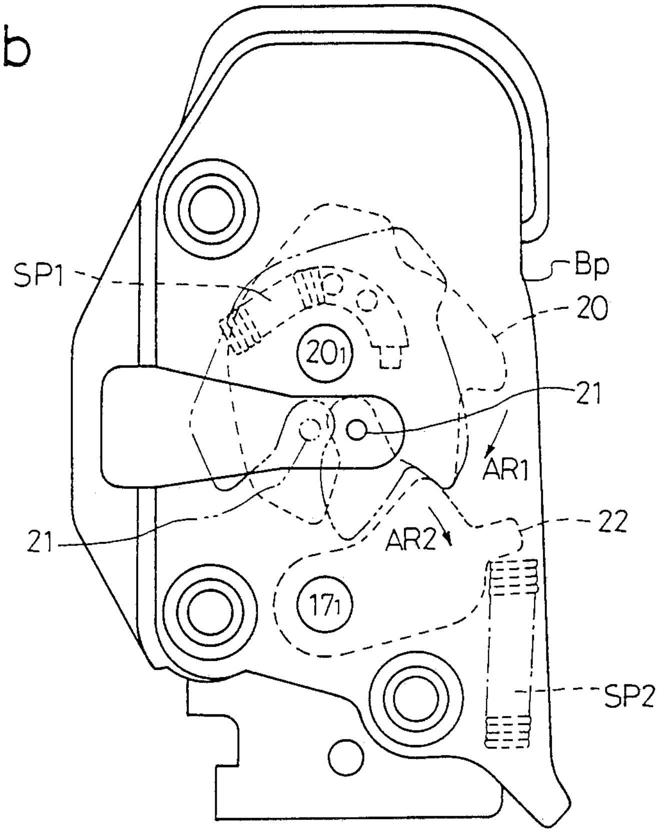
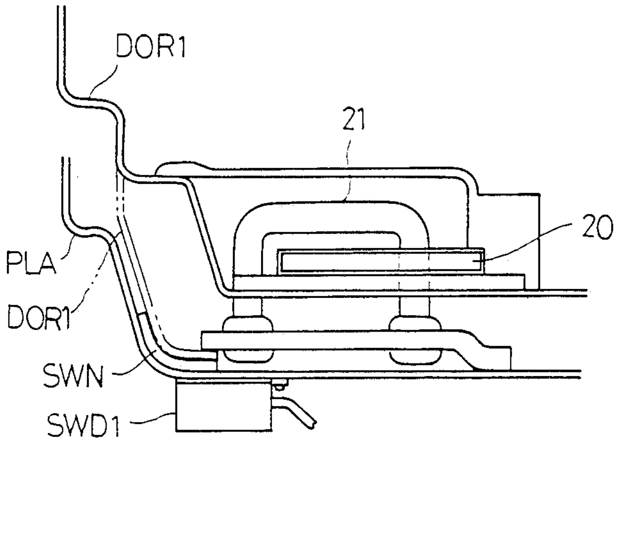
Fig.2c

EMERGENCY UNLOCK ASSEMBLY FOR ONBOARD LOCK MECHANISM

BACKGROUND OF THE INVENTION

The invention relates to an emergency unlock assembly for unlocking a door lock mechanism or the like in the event of an emergency as when a vehicle is impacted.

Usually, a door of a vehicle is provided with a latch mechanism which latches a door against opening, and a door lock mechanism which inhibits a releasing or unlatching of the latch mechanism. When the door lock mechanism is unlocked, an outside door handle or an inside door handle may be operated to unlatch the latch mechanism to open the door. Conversely, when the door lock mechanism is locked, operation of either outside or inside door handle cannot release the latch mechanism to open the door. Some vehicle is provided with a different form of latch mechanism which can be unlatched by an operation of an inside door handle, independently from the locked/unlocked condition of the door lock mechanism. The purpose of the door lock mechanism of this kind is to prevent a theft or a tampering with the vehicle, by preventing a door from being opened from the outside without a door key as long as the door mechanism is locked. However, this presents a problem that in the event a vehicle encounters a crash to cause a loss of consciousness of an occupant, the rescue of the occupant may be delayed because the door remains locked.

To answer this problem, there is proposed an emergency unlcok assembly which is provided with an impact sensor and a solenoid for unlocking the door lock mechanism and which is thus able to unlock the door lock mechanism by the energization of the solenoid upon detection of an impact.

One of disadvantages of the emergency unlock assembly of the kind described resides in the fact that it operates irrespective of the presence or absence of an occupant. By way of example, the emergency unlock assembly may be actuated by applying an impact to an unmanned vehicle during its parking, thus unlocking the door lock mechanism for purpose of theft of the vehicle itself or articles placed therein or tampering therewith.

It is an object to prevent an improper use of an emergency unlock assembly on a vehicle.

SUMMARY OF THE INVENTION

The above object accomplished by an emergency unlock assembly for onboard lock mechanism accoriing to the invention which is operable to unlock a lock mechanism associated with an onboard opening cover such as a vehicle boarding door in response to the detection of an impact applied. In accordance with the invention, the assembly includes means for detecting the presence or absence of an occupant within a vehicle. The lock mechanism is unlocked in response to the detection of an impact applied on the condition that the presence of an occupant has been detected. Thus, the lock mechanism is unlocked in response to an impact if an occupant is located within the vehicle, but the lock mechanism cannot be unlocked in the absence of an occupant if an impact has been detected. Thus, the emergency unlock assembly contributes to a rapid rescuing of an occupant while preventing an improper use thereof in a theft or tampering with the vehicle.

Depending on the construction of the door lock mechanism, the invention may be embodied in a variety of specific manners including an electrical or a mechanical configuration or the both. By way of example, in a preferred embodiment of the invention, the invention may be applied to a mechanical lock mechanism which is associated with a door of an automobile. In this instance, the assembly includes a solenoid which is operable to unlock the lock mechanism, a driver for energizing the solenoid, switching means connected in a signal line which couples a signal input terminal of the driver with a signal output terminal of an impact sensor, and switching control means for controlling the turn-on and -off of the switching means. When occupant detecting means has detected the presence of an occupant, the switching control means turns the switching means on while when the absence of an occupant is detected, the switching means is turned off. Since a time period during which occupant detecting means detects the presence or absence of an occupant is far greater than a time period during which the impact sensor detects the application of an impact, this arrangement is equivalent to the absence of any decision element interposed between the signal input terminal of the driver and the signal output terminal of the impact sensor, enabling a rapid response to an output from the impact sensor in the presence of an occupant.

Other objects and features of the invention will become apparent from the following description of an embodiment thereof with reference to the drawings.

Figure 1:
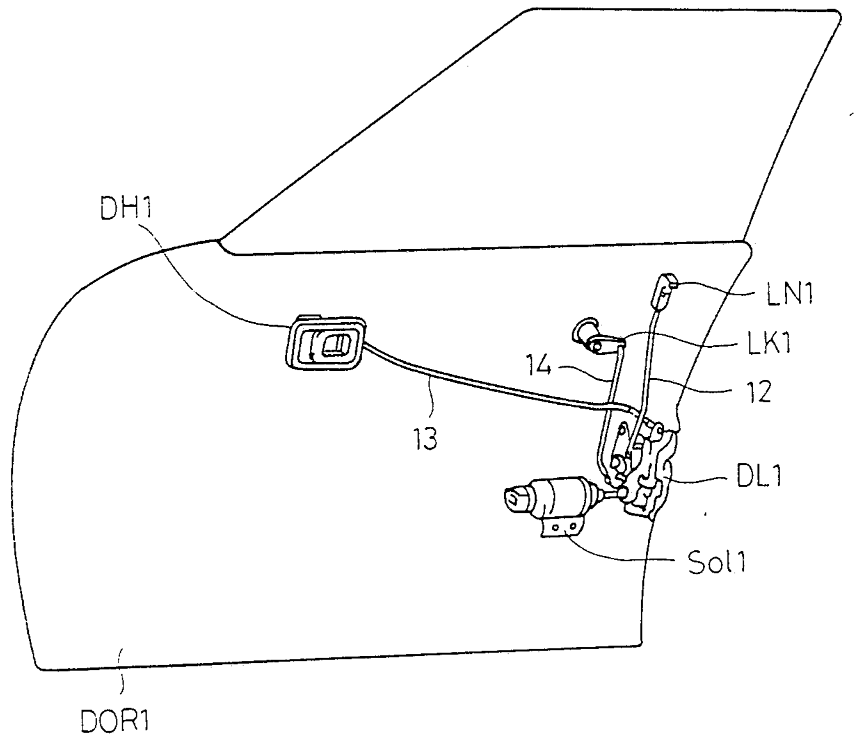
FIG. 1 is a perspective view of a mechanical construction of an emergency unlock assembly for a door lock of an automobile according to one embodiment of the invention, illustrating the appearance of part thereof.

FIG. *2a* is a perspective view showing the detail of the door lock mechanism shown in FIG. 1;

FIG. *2b* is a side elevation showing the detail of a door latch mechanism shown in FIG. 1;

FIG. *2c* is a cross section of part of the door latch mechanism shown in FIG. 1;

FIG. *2d* is a side elevation showing the detail of a door lock solenoid Sol1 shown in FIG. 1;

FIG. *2e* is an enlarged side elevation of part of the door lock solenoid Sol1 shown in FIG. *2d;*

FIG. *3a* is a block diagram of a control system which controls the arrangement shown in FIG. 1;

FIG. *3b* is a cross section of an impact sensor G1 shown in FIG. *3a;*

Figure 4:
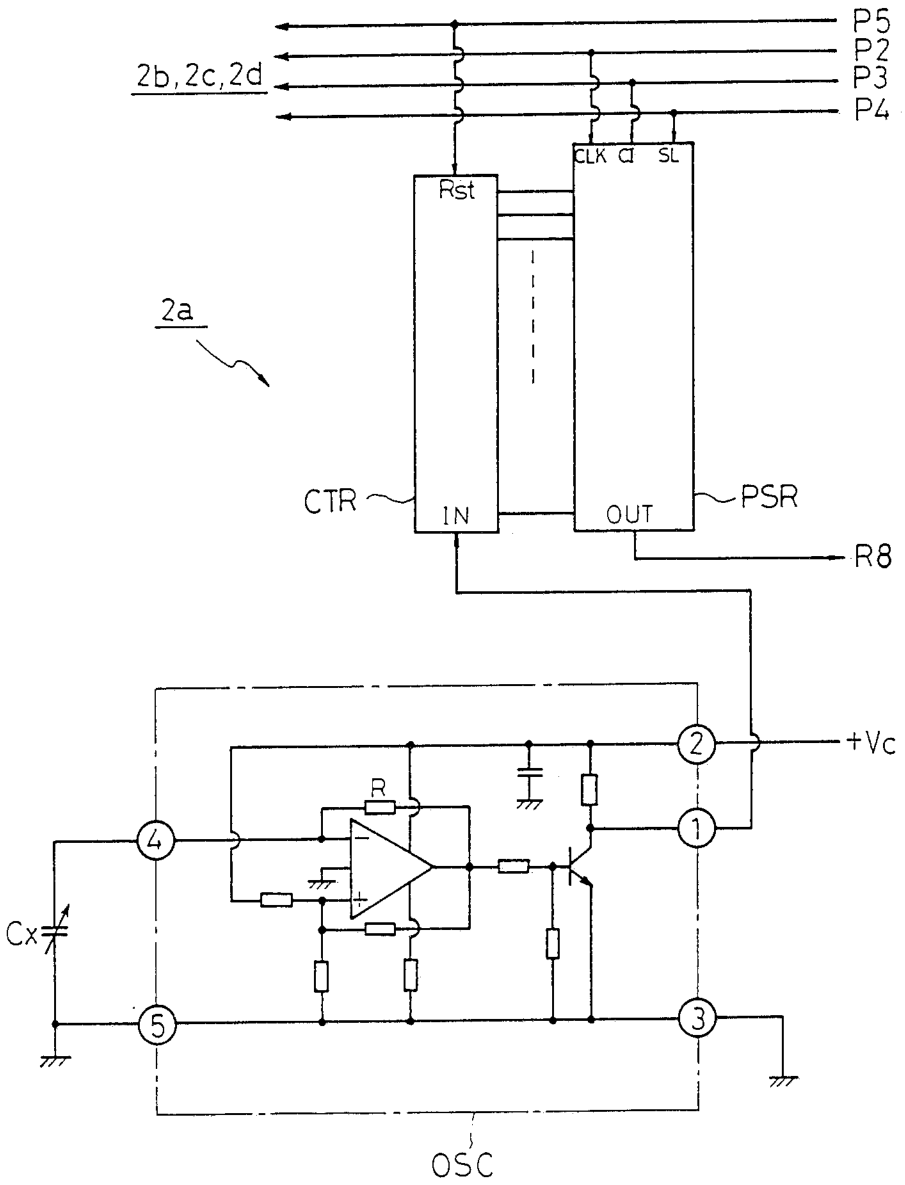

FIG. 4 is a block diagram of an occupant detector unit *2a* for detecting any occupant on a driver's seat shown in FIG. *3a;*

Figure 5:
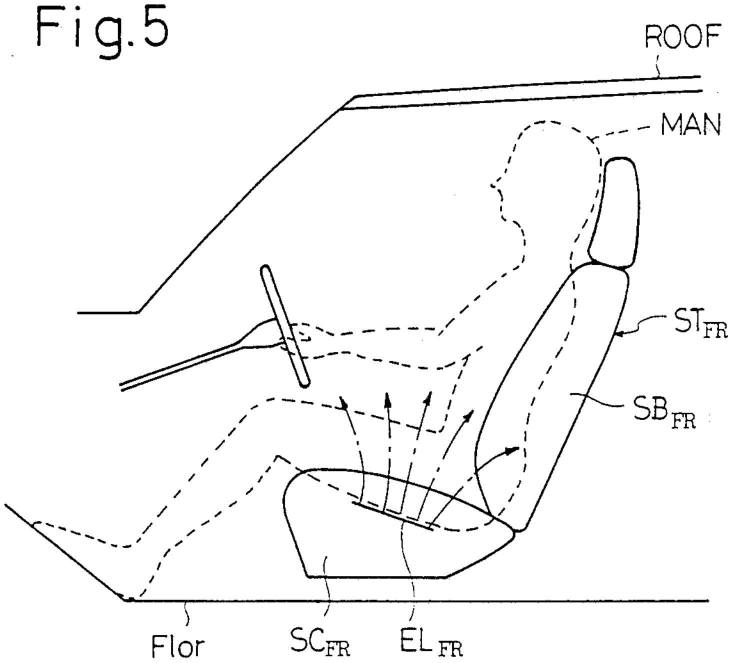

FIG. 5 is a side elevation of a detecting electrode $EL_{FR}$ mounted in the driver's seat $ST_{FR}$;

FIG. *6a* is a perspective view, partly broken away, of the driver's seat $ST_{FR}$;

FIG. *6b* is a cross section of a seat cushion $SC_{FR}$ taken along the line VIB—VIB shown in FIG. *6a;*

FIG. *6c* is a perspective view of a trim cover assembly 50 of the seat cushion $SC_{FR}$ shown in FIGS. *6a* and *6b;*

Figure 7:
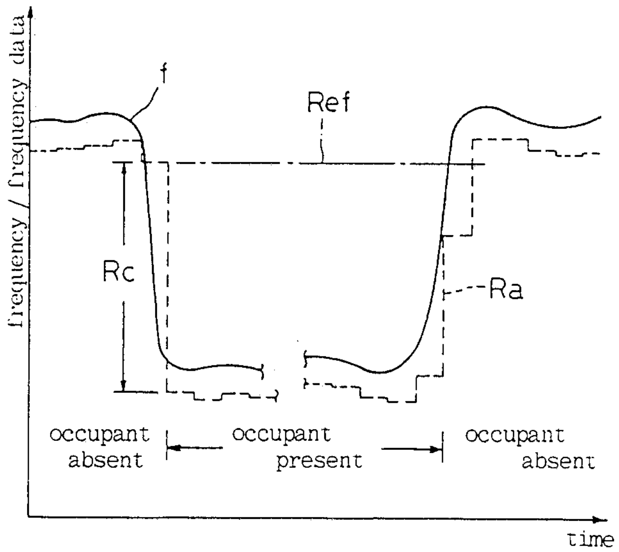

FIG. 7 graphically shows the principle of detecting the presence of an occupant by a microcomputer 1 shown in FIG. *3a;*

Figure 8:
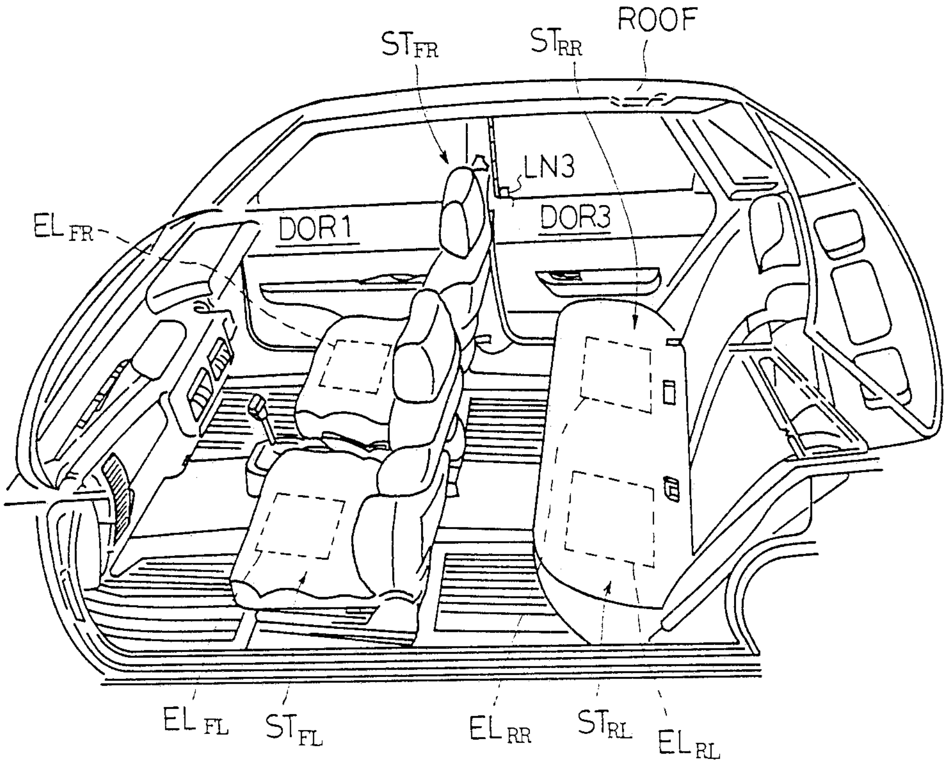
Figure 9:
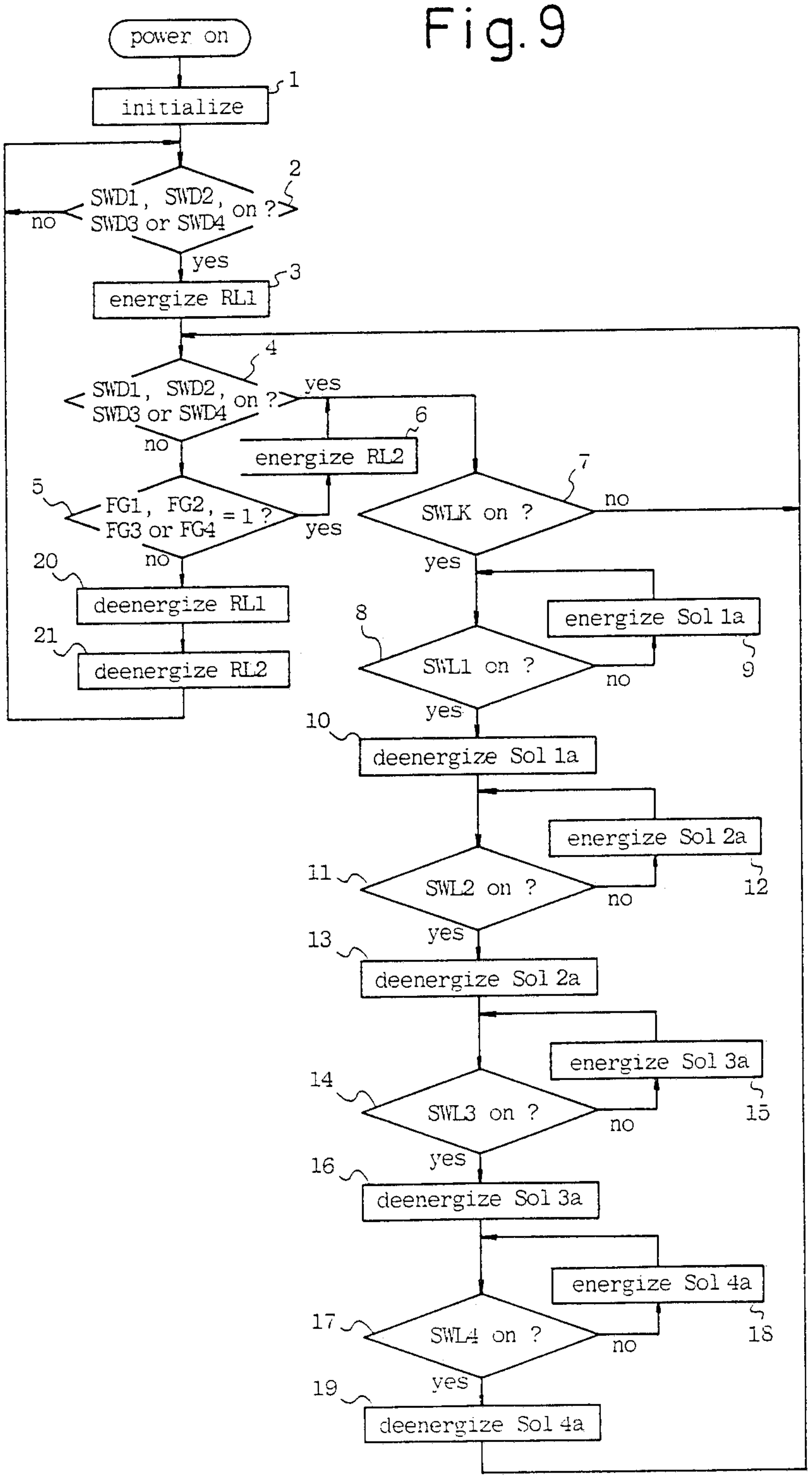
Figure 10:
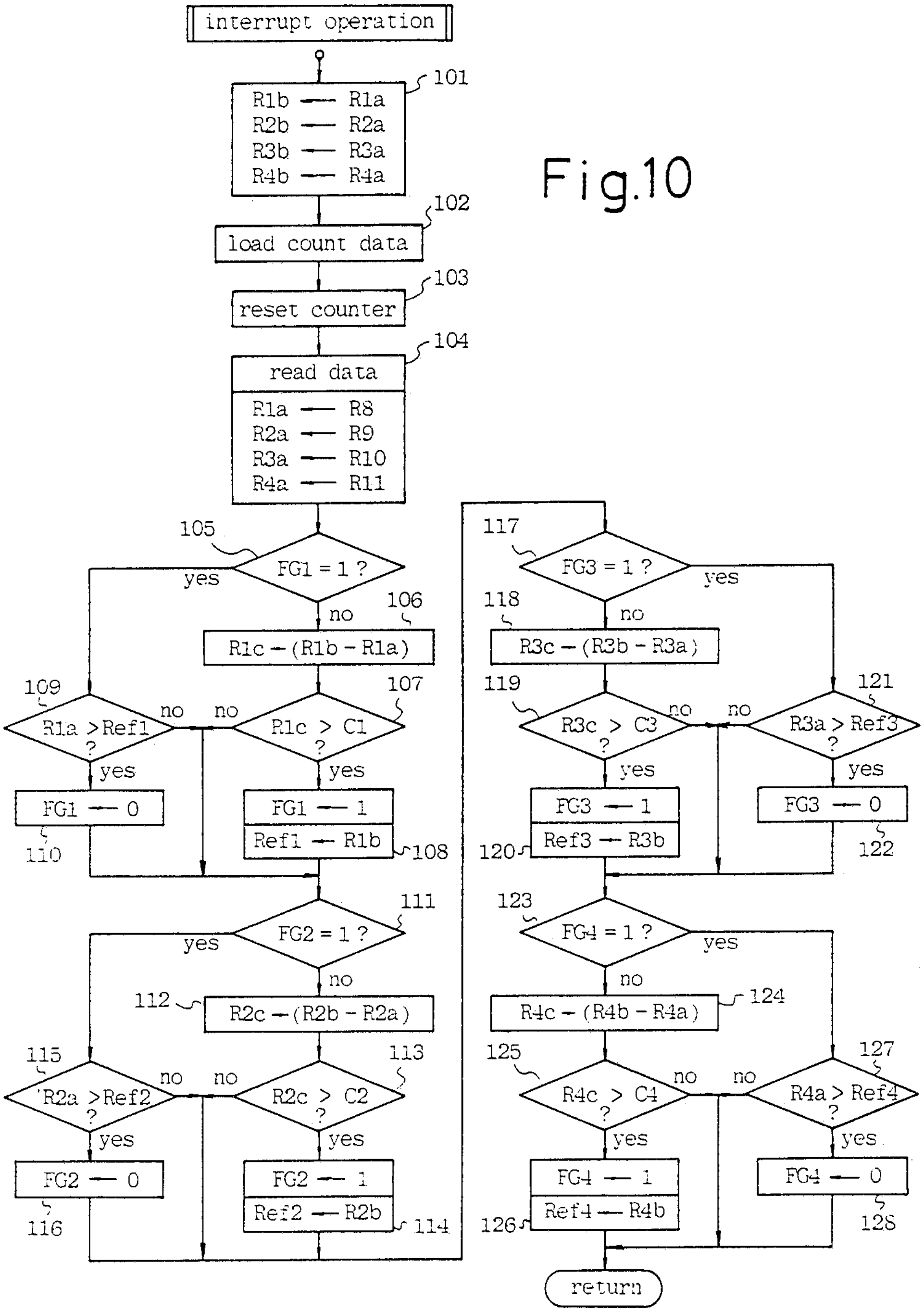

FIG. 8 is a perspective view showing the layout of detecting electrodes $EL_{FR}$, $EL_{FL}$, $EL_{RR}$ and $EL_{RL}$ located within a vehicle; and FIGS. 9 and 10 are flowcharts of operations performed by the mcrocomputer 1 shown in FIG. 1.

DESCRIPTION OF EMBODIMENT

FIG. 1 is a perspective view illustrating part of a mechanism which is used in a door unlock assembly for an automobile having the capacity for four passengers which is constructed in accordance with one embodiment of the invention, specifically showing a door lock and latch mechanism DL1 mounted on a front right-hand (hereafter abbreviated as FR, the same denotation being used as a suffix) door DOR1 and a peripheral construction therefor.

Referring to FIG. 1, the door lock and latch mechanism DL1 is engaged by a door lock solenoid Sol1 supported by the FR door DOR1, an inside door locking button LN1, an inside door handle DH1, a door key cylinder LK1 and an outside door handle (not shown) which is mounted on the outside of the door DOR1.

Figure 2A:
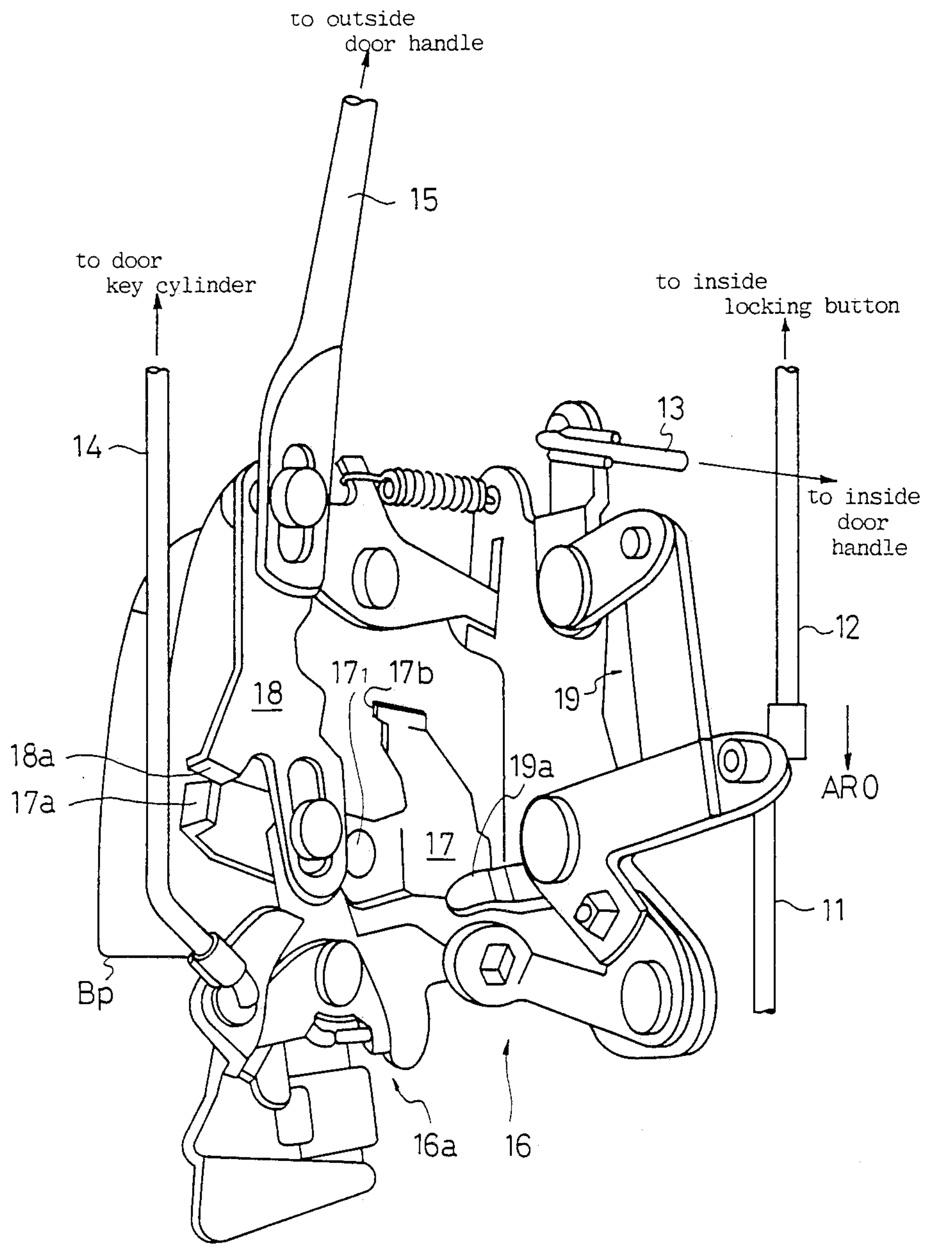

FIG. 2*a* shows the appearance of a door lock mechanism for the door lock and latch mechanism DL1 associated with the FR door DOR1. Specifically, the unlocked condition of the door is shown in FIG. 2*a*. Under this condition, an unlatch plate 17 and a pushing plate 18 engage each other at their respective folds 17*a*, 18*a*. Hence, when the pushing plate 18 is driven downward, as viewed in this Figure, the unlatch plate 17 is rotated counter-clockwise about a pivot $17_1$, which is pivotally mounted on a baseplate BP. The opposite ends of the pivot are secured to the unlatch plate 17 and a detent lever 22 of the door latch mechanism which will be described later in connection with FIG. 2*b*, whereby an angular movement of the unlatch plate is transmitted to the detent lever 22 to unlatch the door latch mechanism, thus allowing the door to open. The pushing plate 18 is driven by an outside door handle through a rod 15. Thus, under the unlocked condition, the outside door handle may be operated to unlatch the door latch mechanism.

In this connection, it will be understood that by releasing the engagement between the folds 17*a* and 18*a* of the unlatch plate 17 and the pushing plate 18, respectively, the unlatch plate 17 cannot be angularly driven if the outside handle is operated. This represents a locked condition.

The mechanism can be locked from its unlocked condition shown in FIG. 2*a* in three ways. First, the inside door locking button LN1 may be operated for purpose of locking. Specifically, it may be depressed downward as viewed in FIG. 1, whereby a rod 12 moves in a direction indicated by an arrow AR0, thus displacing the pushing plate 18 to the right, as viewed in this Figure, through a linkage 16 and a swivel mechanism 16*a*. Second, the door key cylinder LK1 may be operated for purpose of locking. Specifically, when it is turned counter-clockwise, as viewed in FIG. 1, a rod 14 is driven upward, thus displacing the pushing plate 18 to the right, as viewed in FIG. 2, acting through the swivel mechanism 16*a*. Third, the door lock solenoid Sol1 may be energized. This pulls a rod 11 downward, as viewed in FIG. 2, whereby a lock condition is established in the same manner as when the inside door locking button LN1 is operated. The unlocked condition may be established by a reverse procedure to that mentioned above. However, it is to be noted that since the door lock solenoid Sol1 is acting in one direction, it cannot be utilized for purpose of unlocking. The door latch mechanism may be utilized to unlock the door, independently from the above means, as will be described later.

Figure 2D:
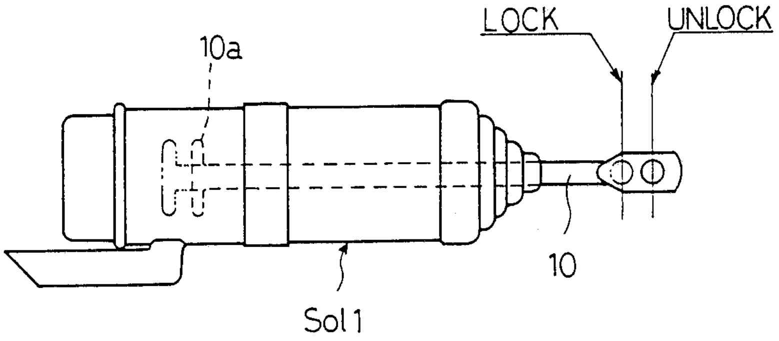
Figure 2E:
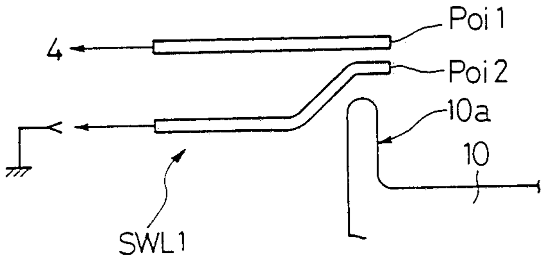

Referring to FIGS. 2*d* and 2*e*, the door lock solenoid Sol1 will now be described. The door lock solenoid Sol1 comprises a bilateral solenoid including a pair of solenoid coils Sol1*a* and Sol1*b*. When the coil Sol1*a* is energized, its plunger 10 is driven toward the position LOCK while when the coil Sol1*b* is energized, the plunger 10 is driven toward the position UNLOCK. Since the plunger 10 is engaged by the rod 11, the rod 11 is pulled downward, as viewed in FIG. 2*a* in response to the energization of the coil Sol1*a* and is pushed upward as viewed in FIG. 2*a* in response to the energization of the coil Sol1*b*.

The plunger 10 is internally formed with a flange 10*a*, which operates upon an internally housed door lock switch SWL1 shown in FIG. 2*e*, completing the connection between switch leads Poi1 and Poi2 of the switch SWL1 in the position LOCK and opening the circuit between these switch leads in its position UNLOCK.

It will be noted that the inside locking button LN1, the door key cylinder LK1, the plunger 10 of the door lock solenoid Sol1 and the pushing plate 18 (as far as its lateral moven'ent, as viewed in FIG. 2*a*, is concerned) are mechanically coupled together through the rods 11, 12, 14, the linkage 16 and the swivel mechanism 16*a*, whereby operation of one of these members changes the condition of others. By way of example, when the door key cylinder LK1 is operated for locking, the inside locking button LN1 is driven to its depressed position which it assumes when the button is operated, and the plunger 10 is driven to its position LOCK while when the door key cylinder LK1 is operated for unlocking, the inside locking button LN1 is driven to its unlocked position and the plunger 10 is driven to its position UNLOCK. Hence, the door lock switch SWL1 which is internally housed within the door lock solenoid Sol1 operates to detect the locked/unlocked condition of the door lock mechanism.

On the other hand, the inside door handle DH1 is effective, when operated, to act upon the unlatch plate 17 for its angular movement through the rod 13, a linkage 19 and a swingable lever 19*a*, independently from the pushing plate 18. Accordingly, if the door lock mechanism is in its locked condition, the inside door handle DH1 may be operated or pulled toward the viewer, as viewed in FIG. 1, to unlatch the door latch mechanism. This provides for an emergency exit from the vehicle.

FIG. 2*b* schematically shows the door latch mechanism of the door lock and latch mechanism DL1. In FIG. 2*b*, the left-hand side of this Figure corresponds to the inboard side of the vehicle. The door latch mechanism comprises aforked bolt 20 mounted on the door DOR1, a detent lever 22, and a striker 21 which is mounted on a car body (which is actually a center pillar PLA shown in FIG. 2*c*). The forked bolt 20 is fixedly mounted on a pivot $20_1$ which is pivotally mounted on the baseplate BP, and is urged to rotate clockwise or in a direction indicated by an arrow AR1, by a coiled compression spring SP1. The detent lever 22 is fixedly mounted on the rotatable pivot 17*l*, mentioned above, and is urged to rotate counter-clockwise or in the opposition direction from an arrow AR2 by a coiled compression spring SP2.

Illustration in broken lines shown in FIG. 2*b* indicate a fully latched condition in which the forked bolt 20 has seized the striker 21 and has been rotated counter-clockwise sufficiently until its further rotation is constrained by the detent lever 22. Phantom lines in FIG. 2*b* show a primary latch condition or a so-called half-door condition in which the forked bolt 20 has seized the striker 21, but its angular movement is constrained by the detent lever 22 before it has been sufficiently rotated.

As mentioned previously, the pivot $17_1$ is pivotally mounted on the baseplate, and is secured to the unlatch plate 17 of the door lock mechanism on the end remote from the detent lever 22, and thus is rotatable together with the unlatch plate 17. When the detent lever 22 rotates in the direction of the arrow AR2, the forked bolt 20 is released from constraint against rotation, whereby it rotates in the direction of the arrow AR1 under the resilience of the spring SP1, thus disengaging it from the striker 21. Thus, the mechanism is unlatched to permit the door DOR1 to be opened.

When the door DOR1 is closed, the striker 21 abuts against the forked bolt 20, forcibly rotating the striker 21 and the detent lever 22 against the resilience of the springs SP1 and SP2, respectively. In this manner, the latch mechanism is latched by an opposite procedure from that mentioned above. Since the detent lever 22 rotates at this time, the unlatch plate is also driven for rotation through the pivot $17_1$. Accordingly, when the lock mechanism is in its locked condition, a pawl **17*b* formed on the end of the unlatch plate 17 drives the pushing plate 18** to the left, as viewed in FIG. 2*a*, thus establishing the unlatched condition. However, if the outside door handle is then operated, the pushing plate 18 moves down, as viewed in FIG. 2*a*, to be disengaged from the pawl **17*b***, whereby the unlatched condition cannot be established. This is referred to as a keyless lock system, which eliminates the need for a troublesome operation of the door key cylincer each time the door is to be locked from the outside of the vehicle.

FIG. 2*c* is a horizontal section of the door latch mechanism, with the solid line indicating the primary latch condition and a double dot phantom line indicating a fully latched condition. In the primary latch condition, there is a small clearance between the door DOR1 and the center pillar PLA, but such clearance is substantially eliminated in a fully latched condition. The center pillar PLA is provided with an FR door courtesy switch SWD1 which detects an open or closed condition of the FR door, with a switch knob SWN being mounted on the door DOR1.

When the door latch mechanism assumes its fully latched condition, the door DOR1 operates on the switch knob SWN to turn the switch off. Under other conditions including the primary latch condition, the switch knob SWN is displaced to the right under the resilience of an internally housed spring, thereby turning the switch on.

Since it is contemplated that the arrangement of the invention is mounted on a four door automobile, and hence a similar latch mechanism and lock mechanism are associated with each of a front left-hand (hereafter abbreviated as FL, the same denotation being used as a suffix), a rear right-hand (hereafter abbreviated as RR, the same denotation being also used as a suffix) and a rear left-hand (hereafter abbreviated as RL, the same denotation being also used as a suffix) door. Their specific constructions will not be described, only pointing out the fact that the RR and RL doors are not provided with a door key cylinder.

Figure 3B:
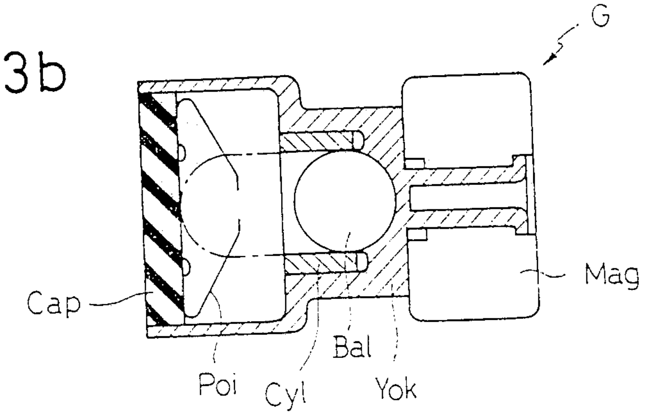
Figure 3A:
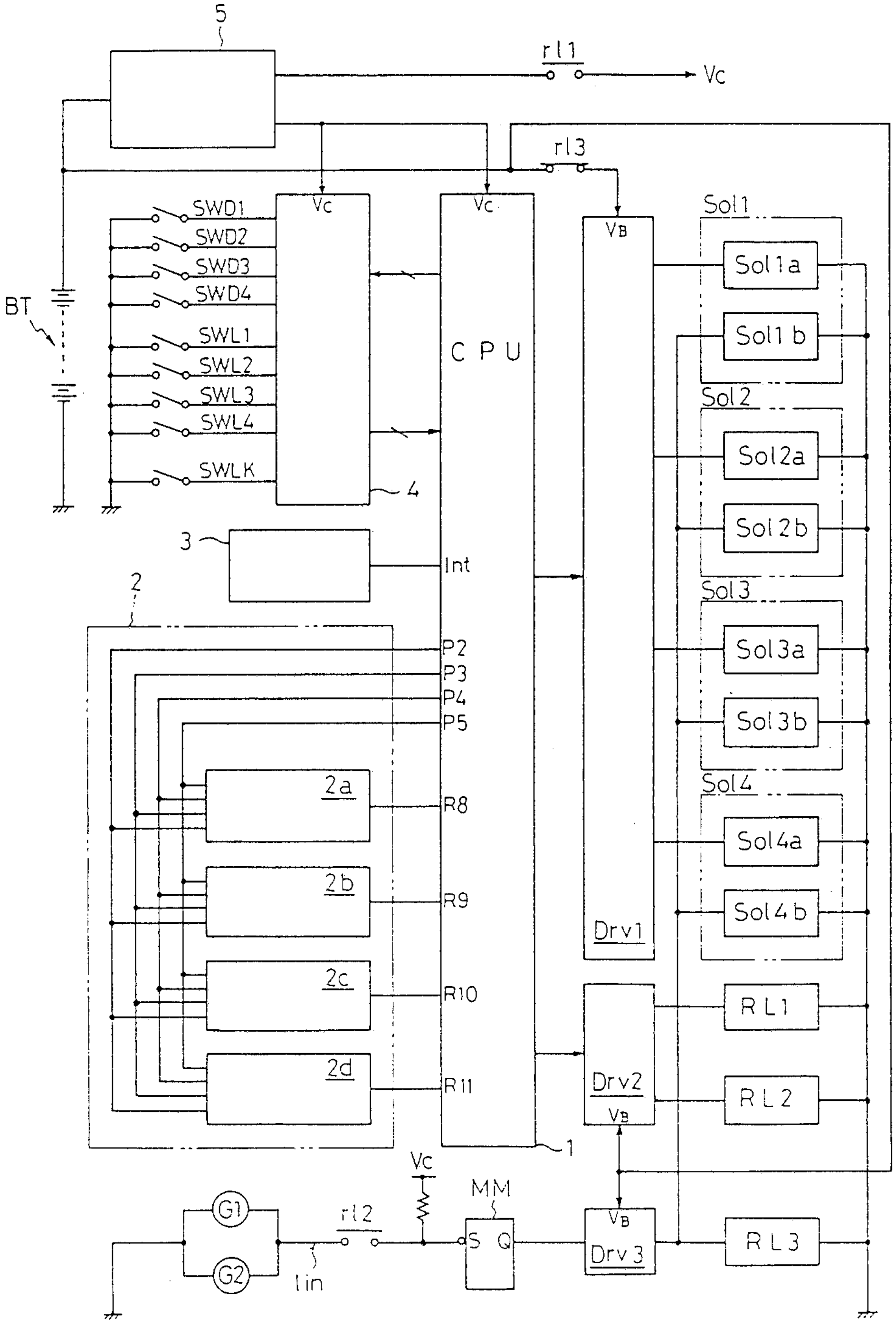

FIG. 3*a* is a block diagram of a control system which controls the emergency door unlock assembly of the invention. The control system includes a microcomputer (hereafter abbreviated as CPU) 1 as its heart, and also comprises an occupant detector unit 2, 0.1 second timer 3, a switch encoder 4, a solenoid driver Drv1 and a relay driver Drv2, all of which constitute together a normal control system, as well as impact sensors G1 and G2, monostable multivibrator MM and a solenoid and relay driver Drv3, all of which constitute an emergency control system.

The control system is fed from an onboard battery BT, and a battery voltage $V_B$ is fed from a power supply unit 5 through the relay drivers Drv2, Drv3 and a relay contact rl3 (a break contact) to the solenoid driver Drv1. The power supply unit 5 supplies a constant voltage Vc to CPU 1, the switch encoder 4, and through a relay contact rl1 (a make contact), to the occupant detector unit 2 and the 0.1 second timer 3.

The solenoid driver Drv1 is connected with locking drive coils Sol1*a*, Sol2*a*, Sol3*a* and Sol4*a* which are associated with door lock solenoids of the respective door lock mechanisms. The driver Drv1 selectively energizes or deenergizes these coils in accordance with a command from CPU 1.

The relay driver Drv2 is connected with relays RL1 and RL2. The driver Drv2 selectively energizes or deenergizes these relays in accordance with a command from CPU 1. The relay RL1 contains the relay contact rl1 mentioned above, and when energized, makes this contact to connect the detector unit 2 and the timer 3 to the supply line which provides the constant voltage Vc. The relay RL2 contains a relay contact rl2, to be described later, and makes this contact when it is energized.

Connected to the switch encoder 4 are an FR door courtesy switch SWD1 (see FIG. 2*c*) which detects the open or closed condition of FR door DOR1; an FL door courtesy switch SWD2 which detects the open or closed condition of FL door; an RR door courtesy switch SWD3 which detects the open or closed condition of RR door; an RL door courtesy switch SWD4 which detects the open or closed condition of RL door; an FR door lock switch SWL1 (see FIG. 2*e*) which detects the locked/unlocked condition of FR door lock solenoid Sol1; an FL door lock switch SWL2 which detects the locked or unlocked condition of FL door lock solenoid Sol2; an RR door lock switch SWL3 which detects the locked or unlocked condition of RR door lock solenoid Sol3; an RL door lock switch SWL4 which detects the locked or unlocked condition of RL door lock solenoid Sol4; and a salvo lock switch SWLK which is mounted on the arm rest of FR door DOR1. The switch encoder reads the status of all of these switches to feed corresponding information to CPU 1.

The 0.1 second timer 3 has an output terminal connected to an interrupt port Int of CPU 1, and generates an interrupt request to CPU 1 every 0.1 second. During an interrupt operation which is initiated by the interrupt request from the timer 3, CPU 1 detects the presence or absence of an occupant on each seat using the occupant detector unit 2 to be described below.

The detector unit 2 includes four sections **2*a*, 2*b*, 2*c* and 2*d* associated with FR, FL, RR and RL seat, respectively. FIG. 4 shows the section 2*a*** of the occupant detector unit 2. The unit 2 comprises an oscillator OSC, a counter CTR, and a parallel-in and serial-out shift register (hereafter abbreviated as PS register) PSR.

The oscillator OSC comprises an astable multivibrator with an external capacitor Cx connected between terx'inals 4 and 5. In FIG. 4, resistors are indicated by rectangles. By choosing suitable values for the resistors, there can be obtained an output signal of a frequency which is inversely proportional to the product of the capacitance of the external capacitor Cx and the resistance of resistor R, the frequency decreasing for an increased capacitance and increasing for a decreased capacitance of the external capacitor Cx.

The output signal from the terminal 1 of the oscillator OSC is applied to an input terminal IN of the counter CTR, which counts up in response to the leading end of the output signal. The counter CTR have 16 bit parallel output terminals which are connected to 16 bit parallel input terminals of the PS register PSR. The counter CTR has a reset input terminal Rst, which is connected to an output port P5 of CPU 1.

The register PSR has a clock input terminal CLK connected to an output port P2 of CPU 1, a clock inhibit input terminal CI connected to an output port P3 of CPU 1, and a shift load input terminal SL connected to an output port P4 of CPU 1. The register PSR presets 16 bit data applied to its parallel input terminals into the respective bit positions in response to the leading end of a shift load pulse fed from CPU 1, and serially delivers the preset data from its output terminal OUT to a serial input port R8 of CPU 1 in synchronism with the clock pulse applied to its clock input terminal CLK in response to a change in the clock inhibit signal applied to the clock inhibit input terminal CI from CPU 1 to its low level (L).

The capacitor Cx shown in FIG. 4 comprises an occupant detecting capacitor defined between a detecting electrode $EL_{RR}$ which is mounted on the seat cushion $SC_{RR}$ of the seat $ST_{RR}$ and the electrical ground defined by the body such as a roof ROOF or a floor Flor, as shown in FIG. 5. Thus, the detecting electrode $EL_{RR}$ is connected to the terminal 4 and the electrical ground is connected to the terminal 5 of the oscillator OSC.

Figure 6A:
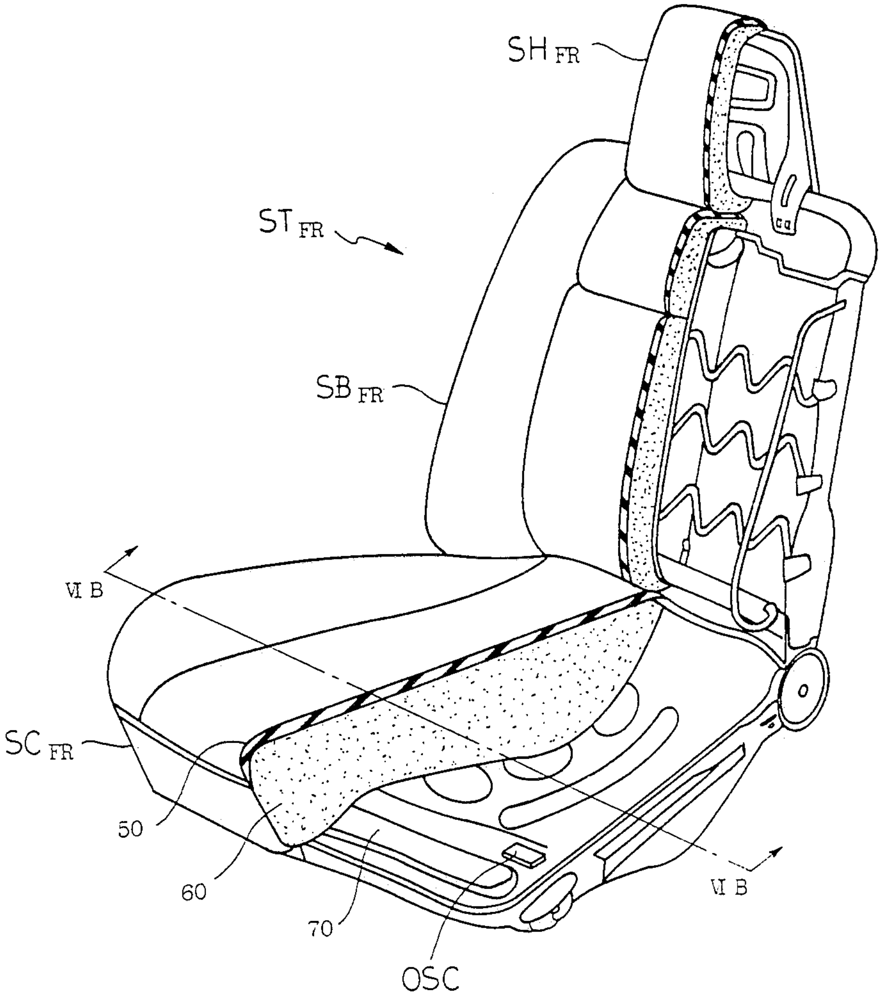
Figure 6B:
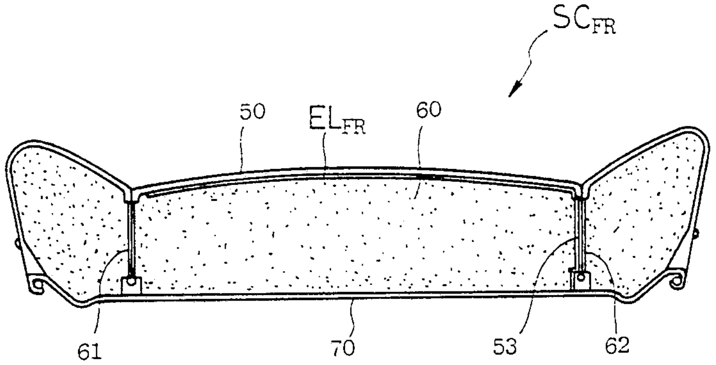

FIG. 6 is a fragmentary cross section, partly broken away, of the seat $ST_{FR}$. The seat $ST_{FR}$ comprises a seat cushion $SC_{FR}$, a seat back $SB_{FR}$ and a head rest $SH_{FR}$. Though the support structure is different, each of these components comprises a fully foamed sheet using a molded urethane pad. FIG. 6b shows a section of the seat cushion $SC_{FR}$ in a region where an occupant MAN is seated taken along the line VIB—VIB in FIG. 6a or in a plane perpendicular to the travelling direction of the vehicle. The seat cushion $SC_{FR}$ comprises a pad support 70 formed of a resin on which a urethane seat cushion pad 60 covered with a trim cover assembly 50 is disposed. Where necessary, the trim cover assembly 50 is fastened to the underside of the seat cushion pad 60 by tension cords extending through holes 61 and 62 formed so as to extend through the seat cushion pad 60, and its opposite ends are fastened to the pad support 70 for retention. The detecting electrode $EL_{FR}$ is assex'bled into the trim cover assembly 50 and has a lead wire 53 which is passed through the hole 62 to the underside of the seat cushion pad 60 so as to be connected to the terminal 4 of the oscillator OSC (not shown) which is mounted on the pad support 70.

Figure 6C:
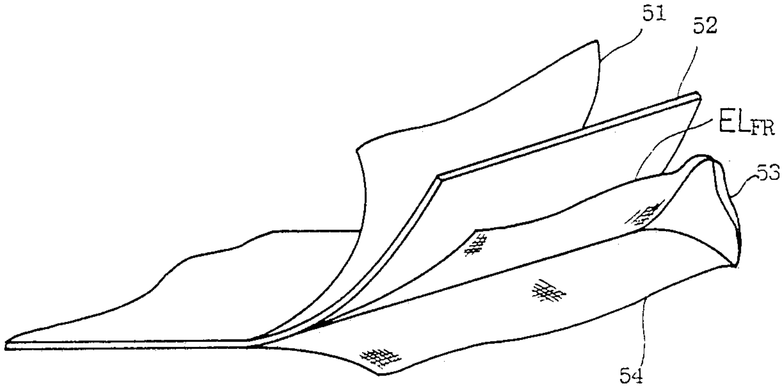

FIG. 6c shows the detail of the trim cover assembly 50 in a region where the detecting electrode $EL_{FR}$ is assembled. Specifically, it compriss a skin 51, a wadding 52 which serves producing the thickness effect of the trim cover assembly and formed by a sheet of sponge material, and a wadding cover 54. The detecting electrode $EL_{FR}$ is formed by a conductive woven fabric which is subjected to an electroless nickel plating, and is interposed between the wadding 52 and the wadding cover 54 to be stitched as the trim cover assembly 50 is sewn. The electrode has a size which depends on an area, the detection of which is desired, but in the present embodiment, it is sized as about 30 cm square, with its corner formed into a ribbon to define the lead wire 53. Thus it will be seen that the detecting electrode $EL_{FR}$ can be assembled into the trim cover assembly 50 without requiring any additional processing step. Because it conforms to other components of the trim cover assembly, the area of the assembly 50 in which the detecting electrode $EL_{FR}$ is assembled can be treated in the same manner as the remainder. In other words, the detecting electrode $EL_{FR}$ has no adverse influence upon the workability, the appearance or seating reaction.

It will be noted that the skin 51, the wadding 52 and the wadding cover 53 which form the trim cover assex'bly as well as the seat cushion pad 60 and the pad support 70 are all formed by insulators, and thus the detecting electrode $EL_{FR}$ is insulated from the electrical grounc to form an occupant detecting capacitor with the electrical ground. Arrows shown in phantom lines in FIG. 5 represent electric lines of force which would be produced when a suitable voltage is applied to the occupant detecting capacitor. Since the occupant MAN seated upon the seat $ST_{FR}$ links with these electric lines of force, such occupant may be considered as a high dielectric member interposed between the electrodes of the occupant detecting capacitor. In other words, the occupant detecting capacitor has a capacitance which varies largely between the presence and the absence of the occupant MAN.

Other sections 2b, 2c and 2d which are not specifically illustrated are all constructed in an identical manner as the section 2a mentioned above, and the oscillator of the respective sections is connected with a detecting electrode $EL_{FL}$, $EL_{RR}$ or $EL_{RL}$ which is assembled into seat $ST_{FL}$, $ST_{RR}$ or STRL, respectively. As shown in FIG. 3, the output terminal of PS register of the respective sections is connected to a serial input port R9, R10, or R11 of CPU 1. The disposition of the four seats as well as the detecting electrodes assembled therein is illustrated in FIG. 8.

Referring to FIG. 7, the detection of the presence of an occupant with the apparatus of the embodiment will be described briefly. FIG. 8 graphically shows an example of a change in the oscillation frequency f of the oscillator OSC with time by a solid line curve, frequency data Ra which is sampled by CPU 1 by a broken line curve and reference data Ref established by CPU 1 by a phantom line curve, respectively.

CPU 1 samples the number of pulses which are output from the oscillator during the interrupt period of 0.1 second timer 3 or during a time interval of 0.1 second, and which corresponds to the oscillation frequency f of the oscillator, thereby monitoring a change in the oscillation frequency f. Specifically, frequency data Ra obtained during a current sampling is compared against old frequency data which is obtained during the immediately preceding sampling to derive change data Rc.

While the oscillation frequency f of the oscillator OSC is continually changing though slightly, there occurs a rapid reduction in a frequency to cause the change data Rc to exceed a given value when the occupant MAN is seated upon the seat $ST_{FR}$. Upon detection of this change, the presence of an occupant is determined, and the frequency data which was obtained before the occurrence of the reduction or obtained during the previous sampling is chosen as a reference data Ref. Subsequently, the frequency data Ra is examined, and the absence of an occupant is determined if it exceeds reference data Ref.

In the emergency control system, the impact sensors G1 and G2 are connected to an output line lin in parallel to each other. The line lin is connected to the set terminal S of a monostable multivibrator MM with the relay contact rl2 (a make contact) of the relay RL2 mentioned above interposed therebetween. Accordingly, an impact detection signal (having an L level) from either the impact sensor G1 or G2 can be applied to the set terminal S of the vibrator MM only when the relay RL2 is energized to make its contact rl2. In response to the application of the L level to its set terminal S, the vibrator MM is triggered by its falling edge to deliver an H level signal having a pulse width of about 1 sec at its output terminal Q, which is then applied to the solenoid and relay driver Drv3.

The driver Drv3 is connected to individual unlocking coils Sol1*b*, Sol2*b*, Sol3*b* and Sol4*b* of the door lock solenoids associated with the respective door lock mechanisms as well as a relay RL3. The driver Drv3 energizes all of these coils and the relay RL3 as long as the H level is applied to its input terminal. As mentioned previously, in response to the energization of the coils Sol1*b* to Sol4*b*, the corresponding door lock mechanisms are driven to their unlocked condition. The individual coils must be energized continuously from the beginning of the drive to unlock the respective door lock mechanisms until all the door lock mechanisms are completely unlocked. The time duration of this energization is established by the multivibrator MM.

When the relay contact rl3 breaks, the solenoid driver Drv1 is disconnected from the supply line. Thus, when the unlocking coils Sol1*b* to Sol4*b* are energized in response to the detection of the impact by either sensor G1 or G2, the solenoid driver Drv1 is disconnected from the supply line, thus preventing the unlocking coils and the locking coils Sol1*a*, Sol2*a*, Sol3*a* and/or Sol4*a* from being energized simultaneously.

The construction of the impact sensor G1 is shown in FIG. 3*b*, which illustrates a section through the central axis thereof. The sensor G1 comprises a magnet Mag, a yoke of magnetizable material Yok, a steel ball Bal, a cylinder of non-magnetic material Cyl, and a cap of insulating material Cap which secures a pair of contacts Poi and Poi together. The steel ball Bal is normally attracted to the yoke Yok as shown under the influence of the magnetic force from the magnet Mag. However, when it is subjected to a strong impact in the axial direction, it springs out to complete a circuit connection between contacts Poi as indicated by phantom lines. When the impact is removed, the resilience of the contacts Poi and the magnetic influence of the magnet Mag returns the ball to its original position. One of the contacts Poi is connected to the signal line (in while the other is connected to the electrical ground.

The impact sensor G2 is constructed in the identical manner as the sensor G1, and the both sensors are mounted on the vehicle so that their central axes are directed perpendicular to each other and are connected in parallel to the signal line lin as indicated in FIG. 3*a*. Accordingly, when the vehicle is subject to a strong impact applied in any direction, at least one of the balls Bal springs out to apply the L level to the signal line lin.

When at least one occupant is within the vehicle, CPU 1 energizes the relay RL2 to connect the signal line lin in circuit, but deenergizes the relay RL2 to disconnect a signal line lin when all the occupant have got out of the vehicle.

The operation of CPU 1 will now be specifically described with reference to flowcharts shown in FIGS. 9 and 10. When an electrical storage battery onboard a vehicle is connected to the circuit of the invention to feed various parts, CPU 1 initilizes the apparatus by resetting various output ports and components at step 1 (the step number being entered in the flowcharts shown in the drawings). Subsequently, a standby mode is established at step 2 in which the status of respective door courtesy switches SWD1 to SWD4 is monitored. During this mode, the relay RL1 is deenergized and the minimum portion of the circuit is fed in order to retard the exhaustion of the onboard battery BT.

When at least one of the four doors is opened, the relay driver Drv2 is commanded to energize the relay RL1 at step 3, thus enabling an interrupt operation by the timer 3. As a result of energization of the relay RL1, the detector unit 2 and the timer 3 are fed with the constant voltage Vc. An interrupt request is then developed by the timer 3 every 0.1 second.

Every time an interrupt requestiis generated by the timer 3, an interrupt processing operation shown in FIG. 10 is executed to detect the presence or absence of an occupant on each seat. The detection of presence of an occupant is not peroormed during the standby mode since there can be no occupant before either door is opened. The interrupt processing operation will be described first with reference to the flowchart of FIG. 10.

In the interrupt processing operation, data in a register R1*a*, R2*a*, R3*a* or R4*a* is stored in register R1*b*, R2*b*, R3*b* or R4*b*, respectively, at step 101. As will be apparent from the following description, this data represents the frequency data obtained during the immediately preceding interrupt operation or 0.1 second before. At step 102, a shift load pulse (SL pulse) is delivered to the shift load input terminal of PS register PSR, and count data in the counter CTR is preset therein. At step 103, a reset pulse is applied to the reset input terminal Rst of the counter CTR, thereby resetting it. In this manner, the counter CTR counts the number of pulses developed by the oscillator OSC during the interrupt period of the timer 3.

At step 104, the clock inhibit signal which is applied to the clock inhibit input terminal CI is changed to its low level (L), whereby preset data in the register PSR which is serially delivered from its output terminal OUT in synchronism with the clock pulse is read. In this manner, the input to the serial input port R8, R9, R10 or R11 is read and is stored in the register R1*a*, R2*a*, R3*a* or R4*a* as frequency data.

An occupant detecting routine comprises steps 105 to 110 for FR seat, steps 111 to 116 for FL seat, steps 117 to 122 for RR seat and steps 123 to 128 for RL seat. The routines are identical, and therefore, only the routine for FR seat will be described.

A flag FG1 indicates the presence or absence of an occupant on the seat $ST_{FR}$. It is initially assumed that the flag is reset to 0, indicating the absence of an occupant. At step 106, the content of register R1*a* is subtracted from the content of the register R1*b* to provide a change data, which is written into register R1*c*. At step 107, the content of the register R1*c* (change data) is compared against a threshold value C1 which is cetermined experimentarily. When no occupant is seated upon the seat $ST_{FR}$, the change data will have a small value and does not exceed the threshold C1. Accordingly the program directly returns to the main routine. However, when an occupant is seated, there occurs a rapid reduction in the oscillation frequency of the oscillator OSC as mentioned previously, whereby the change data exceeds the threshold C1. In this instance, the flag FG1 is set to "1" at step 108, and the content of the register R1*b* or the old frequency data is written into the register Ref1 as reference data.

When the flag FG is set, the content of the register Ref1 or the reference data is compared against the content of the register R1*a* or fresh frequency data at step 109 during the subsequent interrupt processing operation. As mentioned, when an occupant is seated upon the seat $ST_{FR}$, any change in the oscillation frequency of the oscillator OSC is small, and hence the fresh frequency data stored in the register R1*a* cannot exceed reference data stored in the register Ref1. However, when the occupant who has been sitting on the seat $ST_{FR}$ gets out of the vehicle, there occurs a rapid increase in the oscillation frequency, whereby the fresh frequency data stored in the register R1*a* exceeds the reference data stored in the register Ref1. At this time, the flag FG1 is reset to "0" at step 110.

Similarly, in other occupant detecting routines for the remaining seats, flags FG2, FG3 and FG are set or reset in response to the detection of presence or absence of an occupant.

In this manner, during the interrupt processing operation, the presence or absence of an occupant is detected in terms of a change in the capacitance between the detecting electrode $EL_{RR}$ and the electrical ground, thus avoiding the likelihood of an errorneous detection due to the influences of the temperature, humidity or aging effect. It is to be understood that when a baggage or the like is placed upon the seat, a corresponding change in the capacitance differs largely from that which occurs when an occupant is seated, thus avoiding an errorneous detection which might be caused by a conventional seating switch (which is assembled into the seat cushion and is turned on when a weight is applied thereon).

Returning to FIG. 9, the door courtesy switches SWD1, SWD2, SWD3 and SWD4 are monitored at step 4. The on or off condition of these switches corresponds to the open or closed condition of FR, FL, RR or RL door, respectively. If at least one of these switches is on, the program proceeds to step 5. However, when all the doors are closed and accordingly all the door courtesy switches are off, the program proceeds to step 5 where flags FG1, FG2, FG3 and FG4 are monitored. If an occupant remains within the vehicle, at least one of these flags is set during the interrupt operation, and in this instance the program proceeds to step 7 after commanding the relay driver Drv2 to energize the relay RL2 at step 6.

The status of the salvo door lock switch SWLK is examined at step 7. Specifically, CPU 1 monitors the operation of the salvo door lock switch SWLK in a loop comprising steps 4 and 7 when at least one door remains open or in a loop comprising steps 4, 5, 6 and 7 when at least one occupant remains within the vehicle. When the operation of the salvo door lock switch SWLK is detected in either loop, a door lock routine is executed in the manner mentioned below.

In the door lock routine, FR, FL, RR and RL door lock mechanisms are locked in a sequential manner. Initially, the status of FR door lock switch SWL1 is examined at step 8, and if it is off, the driver Drv2 is commanded to energize the FR door lock solenoid Sol1*a* at step 9. This permits the FR door lock mechanism to be driven for locking, and subsequently when the on status of the FR door lock switch SWL1 is detected at step 8, the driver Drv2 is commanded to deenergize the FR door lock solenoid Sol1*a*.

Similarly, when the off status of the FL door lock switch SWL2 is detected at step 11, the FL door lock solenoid Sol2*a* is energized until this switch becomes on. When the off status of the RR door lock switch SWL3 is detected at step 14, the RR door lock solenoid Sol3*a* is energized until this switch becomes on. When the off status of the RL door lock switch SWL4 is detected at step 17, the RL door lock solenoid Sol4*a* is energized until this switch becomes on.

The door lock routine permits a driver of the vehicle to lock all the doors by suitably operating the salvo door lock swich SWLK as when he gets off the vehicle or during the driving of the vehicle, without requiring an operation of each inside locking button (corresponding to that shown at LN1 shown in FIG. 1) or door key cylinder (corresponding to LK1 shown in FIG. 1 and a corresponding key cylinder mounted on the FL door).

During the time when a vehicle is running, all the doors are closed and the presence of an occupant within the vehicle is detected. In this instance, CPU 1 energizes the relay RL2 in a loop comprising steps 4, 5, 6 and 7. In this loop, the relay contact rl2 makes to connect the signal line lin, and accordingly all the door lock mechanisms are unlocked in response to the detection of an impact as determined by the impact sensor G1 and/or G2.

When all the occupants have got off the vehicle, the flags FG1, FG2, FG3 and FG4 are reset during the interrupt operation. When all the doors are closed subsequently, the door courtesy switches SWD1 to SWD4 are turned off, whereupon the program proceeds from step 4 to step 5, step 20 and step 21, commanding the relay driver Drv2 to deenergize the relays RL1 and RL2. This causes the relay contact rl1 to break, removing the power supply to the occupant detector unit 2 and the timer 3. Also, the relay contact rl2 breaks to disconnect the signal line lin.

Subsequently, the program returns to step 2 where the standby mode is established. If an impact is applied to the vehicle in the meantime to turn the impact sensor G1 or G2 on, the disconnection of the signal line lin by the relay contact rl2 prevents the door lock mechanism from being unlocked. In other words, when all the occupants have got off the vehicle and all the doors are closed, there is no need to unlock in response to the detection of an impact. Accordingly, the emergency unlock operation is inhibited, thus protecting the vehicle itself and articles placed therein.

In the described embodiment, the relay contact rl2 which blocks the energization of the solenoid coils Sol1*b* to Sol4*b* is connected in the signal line lin for the impact sensors G1 and G2, but various modifications are possible as by connecting it in a supply line to or the output line from the solenoid and relay driver Drv3, for example.

Relays may be replaced by three state buffer or transistor switches.

While a variety of door lock mechanisms are used on vehicles currently, the invention is applicable thereto provided such mechanisms include a locked and an unlocked condition.

In summary, the emergency unlock assembly for the onboard lock mechanism according to the invention responds to the detection of an impact applied in the presence of an occupant within the vehicle to unlock a lock mechanism for an opening cover such as a door, thus enabling a rapid rescue of an occupant in the event of emergency. In the absence of an occupant, the detection of any impact applied cannot unlock the lock mechanism, thus preventing a theft of or tampering with articles placed therein.

What is claimed is:

1. An emergency unlock assembly for onboard lock mechanism comprising an onboard opening cover which can be opened and closed to cover an opening of a vehicle;

a lock mechanism for blocking an opening movement of the onboard opening cover;

means for detecting an impact applied to a vehicle;

means for detecting the presence or absence of an occupant;

and control means responsive to the detection of an impact applied to unlock the lock mechanism only when the presence of an occupant has been detected.

2. An emergency unlock assembly according to claim 1 in which the onboard opening cover comprises a door of a vehicle and the lock mechanism comprises a door lock mechanism.

3. An emergency unlock assembly according to claim 1 in which the control means comprises drive means operative to unlock the lock mechanism, and energization control means responsive to the detection of an impact applied to energize the drive means only when the presence of an occupant have been detected.

4. An emergency unlock assembly according to claim 3 in which the energization control means comprises energization means for energizing the drive means in response to the detection of an impact applied, and blocking means for blocking the energization of the drive means by said energization means if the absence of an occupant has been detected.

5. An emergency unlock assembly according to claim 4 in which the blocking means comprises switching means connected in a signal input line to the energization means, and switching control means for turning the switching means on when the presence of an occupant has been detected and for turning the switching means off when the absence of an occupant has been detected.

6. nn emergency unlock assembly according to claim 1 in which said means for detecting the presence or absence of an occupant comprises a detecting electrode which defines an electric field passing through at least part of an occupant, means for detecting a capacitance formed by the detecting electrode, and decision means for determining the presence or absence of an occupant on the basis of a change in the capacitance detected.

7. An emergency unlock assembly according to claim 6 in which part of the detecting electrode is mounted on at least part of an onboard seat.

8. An emergency unlock assembly according to claim 6 in which the decision means determines the presence of an occupant in response to an increase in the capacitance detected and determines the absence of an occupant in response to a decrease in the capacitance detected.

* * * * *